250-201 AU 252 EX
8212 XR 2,714,160
CROSS REFERENCE
EXAMINER
July 26, 1955 D. J. MacDOUGALL 2,714,160
PHOTOELECTRIC CONTROL APPARATUS
Filed June 30, 1951
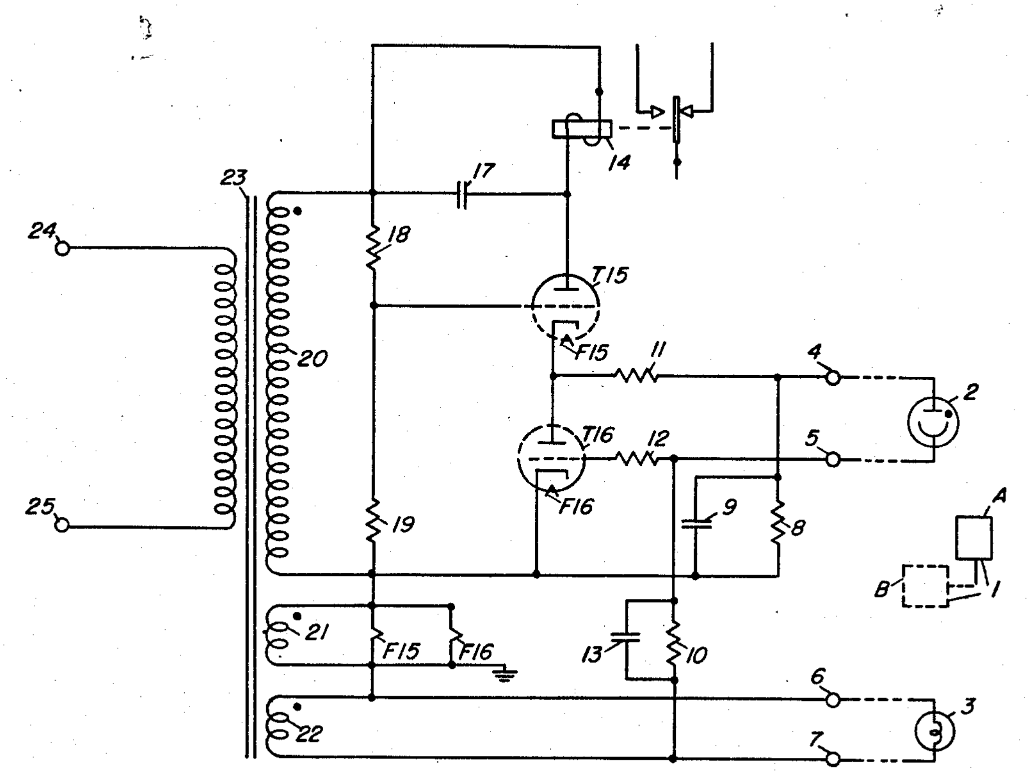
INVENTOR
D. J. MACDOUGALL
BY Q. G. Douvas
ATTORNEY United States Patent Office 2,714,160

Patented July 26, 1955

2,714,160

PHOTOELECTRIC CONTROL APPARATUS

Donald J. MacDougall, Framingham, Mass., assignor to Electronics Corporation of America, a corporation of Massachusetts Application June 30, 1951, Serial No. 234,495

4 Claims. (Cl. 250—27)

This invention relates to new and improved photoelectric apparatus for supervising and controlling the operation of industrial equipment.

In recent years the efficiency of operation of industrial plants has been increased immeasurably by the use of photoelectric equipment to monitor and control the operation of plant machinery. The success of this equipment in many different types of installations has given impetus to the desire to use this type of control wherever possible. As a consequence, photoelectric controls are now applied to innumerable industrial installations of all types. In all of these arrangements, the principle of operation is fundamentally the same. That is, the electrical conditions created by the interrupted or modulated transmission of a light beam which impinges upon a photoelectric cell are utilized to provide a desired industrial control function.

In the usual case, the location of the photoelectric control apparatus is determined by the structure of the controlled equipment and the type of control function desired. It is possible in some installations to have an arrangement wherein the photoelectric cell and its amplifier and power supply source are contained within a single housing. In other installations, because of stringent space requirements as well as other factors, it is impossible or impractical to locate the photoelectric cell amplifier and power supply source with the photoelectric cell. A cable is therefore used to apply the electrical output of the photoelectric cell to the input of its associated amplifier.

For economy reasons it has been the practice to energize most of the photoelectric cells and amplifiers of the prior art by alternating currents, thereby eliminating the use of direct-current rectifiers and filtering circuits. As a consequence, the internal capacity of the cable which interconnected a photoelectric cell to a distant amplifier produced a serious attenuation of the output of the cell, especially where relatively high frequency signal responses were required of the photocell. This attenuation of the cell signal was compensated for by shunting the input of the photoelectric cell amplifier with an objectionably high value capacitor to minimize the overall effect of the cable capacity, or by utilizing additional components to apply a direct-current energizing potential to the photoconductive cell.

In either case, the solution was relatively unsatisfactory because of the additional components required and the attendant cost of installing these components. Furthermore, in the situation wherein the high value capacitor was utilized, if the cable interconnecting the photocell and the amplifier was relatively long, the capacitor in all probability required more space than the rest of the amplifier apparatus.

Accordingly, it is an object of this invention to provide a highly sensitive, reliable, small-sized photoelectric control which is easy and economical to fabricate and which is particularly applicable for installations wherein a relatively long cable is utilized to interconnect a photoelectric cell to the input of its amplifier and where high frequency signal responses are required.

A feature of this invention which provides for the attainment of most of the aforementioned objects is an improved circuit arrangement for connecting a photoelectric cell to an alternating-current energized amplifier whereby said amplifier operates simultaneously as an amplifier and a rectifier so that said photoelectric cell is energized by direct currents.

Another feature of this invention is that during normal standby operation the light beam from the light source impinges upon the photoelectric cell, and all of the tubes of the photocell amplifier conduct current in response to this light condition. This mode of operation is conducive to improved safety of operation in that failure of any principal circuit component will cause the circuit output relay to release its contacts. In the circuit arrangements of the prior art, during standby periods one or more of the principal components was in a non-conducting condition and therefore failure of the non-conducting components would not be readily apparent until the control circuit would be required to function.

In order that all of the features of this invention and the mode of operation thereof may be readily understood, a detailed description follows hereinafter with particular reference being made to the drawing wherein a schematic circuit diagram of a preferred embodiment of this invention is shown.

In a practical, industrial installation of the circuit apparatus, photoelectric cell 2 and light source lamp 3 are located near or on the equipment whose operations are to actuate the control circuit. In particular, lamp 3 and photoelectric cell 2 are positioned so that the light energy from lamp 3 impinges upon the photosensitive electrodes of photocell 2 during a particular phase of operation of the actuating equipment wherein light interrupting means 1 is in position A. When it is desired that the photoelectric apparatus of this invention perform a control function, means operated by the actuating equipment interrupts the transmission of the light beam from lamp 3 to photoelectric cell 2 by causing light interrupting means 1 to assume position B.

The controlling output functions are provided by auxiliary electrical equipment (not shown) whose energizing circuits are completed by the contacts of relay 14. If the light beam from lamp 3 impinges upon photoelectric cell 2, output relay 14 is energized. If, however, the light beam from lamp 3 is interrupted, photoelectric cell 2 causes output relay 14 to release its contacts whereby the circuits for the auxiliary electrical equipment are completed for the type of control herein contemplated.

In view of the fact that the apparatus of this invention was particularly designed for use in industrial installations wherein photoelectric cell 2 is located at an appreciable distance from the control apparatus comprising tubes T15 and T16, photoelectric cell 2 is connected to terminals 4 and 5 by means of a relatively long cable. As a consequence, lamp 3 is also connected in the usual installations to terminals 6 and 7 by means of a relatively long cable.

Transformer 23 provides the energizing currents for the circuit components when a suitable input potential is applied to primary terminals 24 and 25. Transformer 23 comprises a high potential secondary winding 20, a low potential filament winding 21, and a second low potential filament winding 22 for energizing lamp 3. The dots associated with the upper terminal of each secondary winding indicate identical polarities.

The alternating-current potential of secondary winding 20 is applied through relay winding 14 and shunting capacitor 17 to energize the serially-connected main space paths of tube T15 and T16. If, as will be hereinafter explained in detail, sufficient current flows in the main space paths for tubes T15 and T16, relay 14 will be operated. The voltage divider network comprising resistors 18 and 19 is bridged directly across the output terminals of secondary winding 20, and the resistance values of these components are selected so that a bias will be applied to the control grid of tube T15 so that relay 14 will be operated in response to the light impinging upon photoelectric cell 2.

In addition to providing the operate current for output relay 14, tube T15 also acts as a rectifier for the direct-current power supply components for photoelectric cell 2. That is, on each positive alternation, a current impulse is applied to the voltage dividing network comprising serially-connected resistors 11 and 8. The portion of the potential developed across resistor 8 is utilized to charge capacitor 9 so that a relatively smooth direct-current potential appears across the combination comprising resistor 8 and capacitor 9. This potential is applied to photo-electric cell 2 in a circuit which comprises serially-connected transformer secondary windings 21 and 22, resistor 10, terminal 5, photoelectric cell 2, and terminal 4 back to resistor 8. If the light beam transmitted from lamp 3 impinges upon photoelectric cell 2, current will flow in the aforementioned circuit thereby developing a voltage drop across resistor 10 which will charge capacitor 13. The potential developed across the combination comprising resistor 10 and capacitor 13 is applied to the control space path of tube T16 through grid-current limiting resistor 12 and through serially-connected transformer secondary windings 21 and 22 whereby the main space path current flow in tube T16 may be controlled.

The detailed description of the operation of the circuit is as follows. With the application of a suitable input potential to primary winding terminals 24 and 25, the potential of secondary winding 22 energizes lamp 3, the potential of secondary winding 21 energizes the filaments of tubes T15 and T16, and potential of secondary winding 20 causes a current flow in the main space paths of tubes T15 and T16. The potential across the main space path of tube 16 is applied to the voltage divider network comprising serially-connected resistors 11 and 8 whereby capacitor 9 is charged. Inasmuch as the time constant for resistor 8 and capacitor 9 is relatively long compared to the energizing frequency, a relatively smooth direct-current potential appears across resistor 8. This potential is applied to photoelectric cell 2 in a circuit which includes secondary windings 21 and 22 and resistor 10.

If a beam of light from source lamp 3 impinges upon photoelectric cell 2, current will flow in the aforementioned circuit, thereby causing a potential drop across resistor 10 which will charge capacitor 13. The time constant of the network comprising resistor 10 and capacitor 13 is relatively short and therefore the potential applied to the control space path of tube T16 is a relatively high value direct-current potential. This positive direct-current component causes the serially-connected main space paths of tubes T15 and T16 to pass sufficient current to operate output relay 14.

If the light beam from lamp 3 is interrupted by causing light interrupting means 1 to assume position B, the impedance of photoelectric cell 2 will increase in a characteristic manner whereby the potential across the combination of resistor 10 and capacitor 13 will be decreased. This decrease in potential causes a more negative potential to be applied to the control space path of tube T16 whereby insufficient current is caused to flow through output relay 14. As a consequence, output relay 14 releases its contacts and permits the formation of an output electrical circuit (not shown) which controls the associated equipment in response to the interrupted transmission of the light beam from lamp 3 to photoelectric cell 2.

It is to be understood that the above-described arrangements are illustrative of the application of the principles of this invention. Numerous other arrangements may be devised by those skilled in the art without departing from the scope of the invention.

What is claimed is:

1. A control circuit comprising: a source of alternating potential having a plurality of terminals, a first and a second electron tube, each having an anode, a cathode and a control electrode, an output device responsive to current flow therethrough, means including said output device connecting the anode of said first electron tube to a terminal of said source, a direct connection between the cathode of said first tube and the anode of said second tube, means connecting the cathode of said second tube to another terminal of said source, a potential divider having a tap thereon, means connecting said potential divider across said source, a connection between the tap of said potential divider and the control electrode of said first electron tube, a capacitor, means including said capacitor connecting the anode to the cathode of said second tube, a variable conductance device and a resistive load in series therewith, means to connect said variable conductance device and said load between the anode and the cathode of said second electron tube, a connection from the junction of said variable conductance device and of said load to the control electrode of said second electron tube, and means to apply a biasing potential to said second electron tube.

2. A control circuit comprising: a source of alternating potential having a plurality of terminals, a first and a second electron tube, each having an anode, a cathode and a control electrode, an output device responsive to current flow therethrough, means including said output device connecting the anode of said first electron tube to a terminal of said source, a direct connection between the cathode of said first tube and the anode of said second tube, means connecting the cathode of said second tube to another terminal of said source, a potential divider having a tap thereon, means connecting said potential divider across said source, a connection between the tap of said potential divider and the control electrode of said first electron tube, a capacitor, means including said capacitor connecting the anode to the cathode of said second tube, a variable conductance device and a resistive load in series therewith, means to connect said variable conductance device and said load between the anode and the cathode of said second electron tube, a connection from the junction of said variable conductance device and of said load to the control electrode of said second electron tube, and means connected between said load and the cathode of said second electron tube to apply a biasing potential to said second electron tube.

3. A control circuit comprising: a source of alternating potential having a plurality of terminals, a first and a second electron tube, each having an anode, a cathode and a control electrode, an output device responsive to current flow therethrough, means including said output device connecting the anode of said first electron tube to a terminal of said source, a direct connection between the cathode of said first tube and the anode of said second tube, means connecting the cathode of said second tube to another terminal of said source, a potential divider having a tap thereon, means connecting said potential divider across said source, a connection between the tap of said potential divider and the control electrode of said first electron tube, a capacitor and a resistor connected in parallel to form a combination, means including said combination connecting the anode to the cathode of said second tube, a variable conductance device and a resistive load in series therewith, means to connect said variable conductance device and said load between the anode and the cathode of said second electron tube, a connection from the junction of said variable conductance device and of said load to the control electrode of said second electron tube, and means to apply a biasing potential to said second electron tube.

4. A control circuit comprising: a source of alternating potential having a plurality of terminals, a first and a second electron tube, each having an anode, a cathode and a control electrode, an output device responsive to current flow therethrough, means including said output device connecting the anode of said first electron tube to a terminal of said source, a direct connection between the cathode of said first tube and the anode of said second tube, means connecting the cathode of said second tube to another terminal of said source, a potential divider having a tap thereon, means connecting said potential divider across said source, a connection between the tap of said potential divider and the control electrode of said first electron tube, a capacitor and a resistor connected in parallel to form a combination, means including said combination connecting the anode to the cathode of said second tube, a variable conductance device and a resistive load in series therewith, means to connect said variable conductance device and said load between the anode and the cathode of said second electron tube, a connection from the junction of said variable conductance device and of said load to the control electrode of said second electron tube, and means connected between said load and the cathode of said second electron tube to apply a biasing potential to said second electron tube.

References Cited in the file of this patent

UNITED STATES PATENTS

| | | |
|---|---|---|
| 2,075,120 | Lenenhan | Mar. 30, 1937 |
| 2,160,037 | Shepard | May 30, 1939 |
| 2,205,777 | Fairchild | June 25, 1940 |
| 2,228,560 | Cox | Jan. 14, 1941 |
| 2,312,127 | Shepard | Feb. 23, 1943 |
| 2,455,350 | Beam | Dec. 7, 1948 |
| 2,457,289 | Warnick | Dec. 28, 1948 |
| 2,538,536 | Richie et al. | Jan. 16, 1951 |
| 2,582,676 | Bardewick et al. | Jan. 15, 1952 |
| 2,594,423 | Gordon | Apr. 29, 1952 |
| 2,614,227 | Bordewick | Oct. 14, 1952 |